United States Patent Office 3,147,826
Patented Sept. 8, 1964

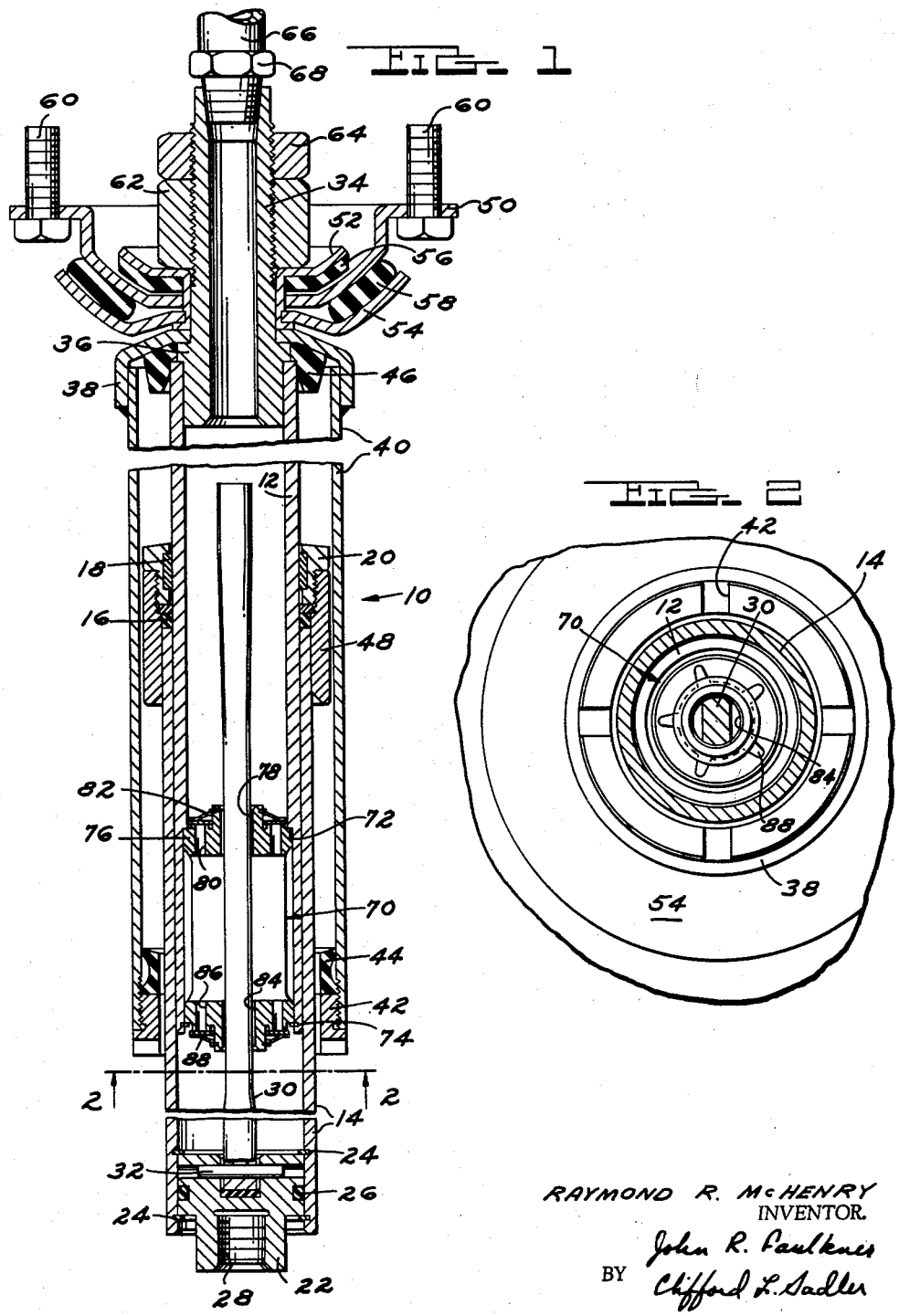

3,147,826
HYDRO-PNEUMATIC SUSPENSION STRUT
Raymond R. McHenry, Westport, Conn., assignor to Ford Motor Company, Dearborn, Mich., a corporation of Delaware
Filed Nov. 21, 1961, Ser. No. 154,016
5 Claims. (Cl. 188—88)

This invention disclosure relates generally to vehicle suspension systems and more particularly to a hydro-pneumatic suspension strut that performs the dual functions of acting as a strut in an air-oil suspension system and as a viscous damper or shock absorber.

In hydro-pneumatic suspension systems, an extensible strut is usually provided at each wheel that functions both as a shock absorber to dampen wheel movement and as a means to transmit hydraulic pressure fluid to a pneumatic device that constitutes the resilient element of the system. Such a strut is distinguishable from the conventional shock absorber in that it contains hydraulic fluid under pressure rather than a fluid at atmospheric pressure under static conditions.

In connection with both hydro-pneumatic struts and conventional shock absorbers, considerable research and development work has been done to perfect a commercially acceptable unit whose degree of resistance to suspension deflection is dependent upon the amplitude of the movement. Such units are usually referred to as being "stroke sensitive."

One method of constructing a stroke sensitive shock absorber or strut is to provide a tapered metering rod carried by either a sprung or an unsprung component of the unit and a metering disk having a control orifice surrounding the metering rod carried by the opposite component. Because the metering rod is tapered, the size of the control opening between the orifice and the rod will vary dependent upon the stroke position or the relative location of the two components. The taper in the metering rod provides an ever-increasing restriction to fluid flow as the amplitude of the suspension deflection increases.

One problem encountered with shock absorbers or struts of this construction is that at the end of an extreme suspension stroke the control orifice is highly restricted so that when the return stroke starts, high resistance is presented to the return movement. It is preferred to have less restriction at the beginning of the return stroke and to build up the resistance as the stroke progresses. When the shock absorber or strut unit begins its return stroke with high resistance, the wheel will tend to momentarily "hang up" and transmit a jar to the passenger compartment of the vehicle with which the unit is associated.

In view of the present state of the art, it is an object of the present invention to provide a stroke sensitive shock absorber construction that eliminates high force build-up at the beginning of the return strokes. More specifically it is an object of this invention to provide in such a device a pair of spaced apart jounce and rebound valve units cooperating with a tapered metering rod having a reduced midportion.

With this construction, the high resistance at the beginning of a return stroke is eliminated. By way of example, at the end of an extreme jounce stroke the opening between the jounce metering orifice and the metering rod will be greatly reduced, however, the rebound metering orifice will be in alignment with the narrow portion of the metering rod to permit an unrestricted beginning of the return or rebound stroke.

The objects and advantages of this invention will become amply apparent from the following discussion and accompanying drawings, in which:

FIGURE 1 is an elevation view in section of a hydro-pneumatic strut constructed in accordance with the present invention; and FIGURE 2 is a sectional view taken along lines 2—2 of FIGURE 1.

Referring now to the drawings for a more detailed understanding of the present invention, FIGURE 1 discloses a hydro-pneumatic strut 10 incorporating its presently preferred embodiment. The strut 10 has an upper end connected to a sprung body member such as a frame bracket and a lower end connected to an unsprung member such as a bracket secured to the axle housing. The strut 10 controls relative movement between those members.

It will be readily appreciated that the drawings and following description disclose an illustrative example of the present invention. Other constructions or modifications are possible, for example, the concept of this invention may be incorporated in a unit which functions purely as a shock absorber rather than as both a shock absorber and a portion of an air-oil suspension system as does the unit disclosed in the drawing.

Within the strut 10 is situated an inner pressure tube 12 and an outer pressure tube 14 which telescopically receives the inner tube 12. A pair of flexible seals 16 and 18 are secured to the upper end of the outer tube 14 by a threaded retainer 20. The seals 16 and 18 are in tight engagement with the exterior surface of the pressure tube 12.

The pressure tube 14 has a lower closure member 22 that is retained in position by a pair of snap rings 24. An O-ring 26 seals the engagement of the piece 22 with the tube 14. A centrally threaded bore 28 is provided for attachment of the lower end of the strut 10 to an unsprung suspension component.

A metering rod 30 extends upwardly concentrically along the axis of the pressure tubes 12 and 14 and has its lower end secured to the end piece 22 by a retaining pin 32. The metering rod 30 is cylindrical in configuration with a pair of opposed faces machined flat as best seen in FIGURE 2. The depth of the flats machined in the metering rod 30 is greatest at its midregion and tapers toward its ends. In other words, the rod 30 is skinny in the middle and thick at its outer ends.

The metering rod 30, tube 14, and the tube's closure assembly constitute the components of the strut that are carried by the unsprung portion of the suspension system.

The inner pressure tube 12 has an upper end welded to a bored out cylindrical piece 34. The piece 34 has a radial flange 36 that is seated on the end of inner tube 12. A cup-shaped member 38 rests against the flange 36 and has a cylindrical dust tube 40 welded to it. The dust tube 40 extends downwardly about the outer pressure tube 14. A threaded retainer 42 is secured to the lower end of the dust tube 40 and retains an annular rubber stop member 44. The cup-shaped piece 38 which forms an upper closure of the dust tube 40 also retains an annular rubber stop member 46.

The rubber element 44 constitutes a resilient rebound stop and the upper rubber element 46 a jounce stop. The upper end of the pressure tube 14, where the seals 16 and 18 are situated, has an annular collar 48 secured to it for strengthening purposes. Upon extreme rebound suspension deflection, the collar 48 will engage the rebound stop 44. Upon extreme jounce suspension deflection, the threaded retainer 20, which is backed up by the collar 48, will engage the rubber stop 46.

A disc-shaped mounting bracket 50 is positioned about the piece 34 between upper and lower washer-shaped members 52 and 54 that have opposed rubber elements 56 and 58 facing the bracket 50. With the assistance of bolts 60 the bracket 50 serves as a means for securing the upper end of the strut 10 to a sprung body component such as a frame member. The bracket 50 is retained loosely between the rubber members 58 and 56 to permit some deflection of the strut 10 during operation and to isolate objectionable vibrations. The sheet metal retainers 52 and 54 and the cup-shaped member 38 of the dust tube 40 are positioned against the radial flange 36 by a pair of nuts 62 and 64 threadably received on the end of the cylindrical piece 34.

A conduit 66 is communicatively connected with the interior of the cylindrical piece 34 by a fitting 68. The opposite end of the conduit 66 is connected to a device having an isolated pressurized air chamber. A flexible diaphragm within the device separates the air chamber from the hydraulic fluid. The strut 10 contains hydraulic fluid under a substantial static pressure which is exerted by the aforementioned air chamber. The expulsion of the hydraulic fluid within the strut 10 upon a jounce stroke transmits fluid through the conduit 66 to the air chamber device for resilient absorption of the suspension deflection. The pressure of the system is exerted against the face of the closure piece 22 for support of the vehicle and may be in the order of 500 pounds per square inch.

The device referred to above constitutes the resilient element of a hydro-pneumatic suspension system. The strut 10 of the present invention may be combined with a variety of different resilient devices to form a complete system. A specific example of such a device may be found in U.S. Patent 3,041,062 issued June 26, 1962, and entitled Hydro-Pneumatic Suspension.

The lower end of the inner pressure tube 12 has a double-headed piston assembly 70. The upper end of the piston 70 is seated against a radial ledge 72 formed in the tube 12, and the lower end is retained by a snap ring 74. The piston assembly 70 has a pair of spaced apart disc-like portions. The upper disc portion 76 has a central bore 78 that constitutes a rebound metering control orifice in concentric position about the metering rod 30. A plurality of circumferentially arranged jounce blow-off openings 80 are closed by spring pressed jounce blow-off valves 82. At the opposite end of the piston assembly 70, a jounce metering control orifice 84 is positioned about the metering rod 30 and supplementing the other end of the piston are a series of rebound blow-off ports 86 closed by spring pressed rebound valve assemblies 88.

During the operation of the strut 10 in a suspension system at the beginning of a jounce stroke the metering rod 30 and pressure tube 14 travel upwardly relative to the tube 12 and piston assembly 70. Fuid trapped between the piston assembly 70 and the closure piece 22 of the tube 14 is expelled through the jounce metering orifice 84 and from there through the blow-off ports 80 past the jounce blow-off valves 82. The controlled resistance to movement is determined by the clearance between jounce orifice 84 and the reduced flats on the metering rod 30. The valve 82 is only lightly spring pressed to permit the easy unrestricted expulsion of hydraulic fluid.

As the jounce stroke continues, the restricted opening between the rod 30 and the metering orifice 84 reduces in size to such an extent as to present a high degree of resistance to fluid flow and hence to relative movement of the strut parts.

When the unit reaches the end of the jounce stroke the rebound stroke begins. At the beginning of this return stroke, the resistance to relative movement is not dependent upon the highly restricted clearance between the metering rod 30 and the jounce orifices 84 because at the beginning of the rebound stroke, the rebound blow-off valves 88 open, the jounce valves 82 close and the clearance between the rebound metering control orifice 78 and the metering rod 30 determines the permissible fluid flow. At the end of the jounce stroke, as the rebound stroke begins, the rebound orifice 78 will be in the narrow neckdown region of the metering rod 30 so that there will be lesser resistance to relative movement upon the reversal in direction.

The foregoing discussion of the operation of the strut 10 is also applicable to extreme rebound. At the end of the rebound stroke the jounce orifice 84 is located at the narrow portion of the rod 30 to permit a nearly unrestricted beginning of the jounce stroke.

The jounce blow-off valves 82 operate as one-way valves to provide a fluid flow path that by-passes the rebound control orifice 78 during a jounce stroke. Similarly the rebound valves 88 form a by-pass passageway for the jounce control orifice 84 during a rebound stroke.

Thus, it is seen that a stroke sensitive strut is provided that has separate fluid paths for jounce and rebound movement in order to provide improved control over suspension movements.

The foregoing description presents the presently preferred embodiment of this invention. Modifications and alterations may occur to those skilled in the art which will come within the spirit and scope of the following claims.

I claim:

1. A hydraulic mechanism for controlling motion having a pressure tube and a piston slideably received within said pressure tube, said piston dividing said pressure tube into first and second fluid pressure chambers, fluid within said chambers, said piston having axially spaced apart first and second control assemblies, said first and second assemblies having first and second control orifices and first and second one-way pressure relief valves respectively, a metering rod connected to said pressure tube and passing through said first and second control orifices, said metering rod and each of said control orifices cooperating to define substantially annular restricted fluid flow paths, said metering rod being tapered to provide an axially graduated cross sectional area, said second relief valve being opened to provide a substantially unrestricted fluid path bypassing said second control orifice when said piston is travelling in a first direction toward said first chamber, said first relief valve being closed when said piston is travelling in said first direction so as to limit the fluid path through said first assembly to said first control orifice, said first relief valve being opened to provide a substantially unrestricted fluid path by passing said first control orifice when said piston is travelling in a second direction toward said second chamber, said second relief valve being closed when said piston is travelling in said second direction so as to limit the fluid path through said second assembly to said second control orifice.

2. A hydraulic mechanism for controlling motion having a pressure tube and a piston axially slideable within said pressure tube, said piston dividing said pressure tube into first and second fluid pressure chambers, fluid within said chambers, said piston having axially spaced apart first and second control assemblies, said first and second assemblies having first and second control means and first and second one-way pressure relief valves respectively, each of said control means providing restricted fluid flow paths, said control means being responsive to the axial position of said piston in said pressure tube in the amount of flow restriction that they provide, said second relief valve being opened to provide a substantially unrestricted fluid path by passing said second control means when said piston is travelling in a first direction toward said first chamber, said first relief valve being closed when said piston is travelling in said first direction so as to limit fluid flow through said first assembly to said first control means, said first relief valve being opened to provide a substantially unrestricted fluid path by passing said first control means when said piston is travelling in a second direction toward said second chamber, said second relief valve being closed when said piston is travelling in said second direction so as to limit fluid flow through said second assembly to said second control means orifice.

3. A hydraulic mechanism for controlling motion having a pressure tube and a piston slideably received within said pressure tube, said piston dividing said pressure tube into first and second fluid pressure chambers, fluid within said chambers, said piston having axially spaced apart first and second control assemblies, said first and second assemblies having first and second control orifices and first and second one-way pressure relief valves respectively, a metering rod connected to said pressure tube and passing through said first and second control orifices, said metering rod and each of said control orifices co-operating to define restricted fluid flow paths, said first relief valve being closed and said second relief valve and said first control orifice being opened when said piston is traveling in a first direction toward said first chamber so that said first control orifice provides the only restriction to the flow of fluid from said first chamber past said piston to said second chamber, said second relief valve being closed and said first relief valve and said second control orifice being opened when said piston is traveling in a second direction toward said second chamber so that said second control orifice provides the only restriction to the flow of fluid from said second chamber past said piston to said first chamber.

4. A hydraulic mechanism for controlling motion having a pressure tube and a piston slideably received within said pressure tube, said piston dividing said pressure tube into first and second fluid pressure chambers, fluid within said chambers, said piston having axially spaced apart first and second control assemblies, said first and second assemblies having first and second control orifices and first and second one-way pressure relief valves respectively, each of said control orifices defining restricted fluid flow paths, said first relief valve being closed and said second relief valve and said first control orifice being opened when said piston is traveling in a first direction toward said first chamber so that said first control orifice provides substantially the only restriction to the flow of fluid from said first chamber past said piston to said second chamber, said second relief valve being closed and said first relief valve and said second control orifice being opened when said piston is traveling in a second direction toward said second chamber so that said second control orifice provides substantially the only restriction to the flow of fluid from said second chamber past said piston to said first chamber.

5. A hydraulic mechanism for controlling motion having a pressure tube and a piston axially slideable within said pressure tube, said piston dividing said pressure tube into first and second fluid pressure chambers, fluid within said chambers, said piston having axially spaced apart first and second fluid flow control means, said first control means providing a restricted path for fluid flow when said piston is traveling in a first direction, said path being of variable size and responsive to the axial position of said piston in said pressure tube for the amount of flow restriction provided, said first control means providing a substantially unrestricted path for fluid flow when said piston is traveling in a second direction, said second control means providing a restricted path for fluid flow when said piston is traveling in a second direction, said just mentioned path being of variable size and responsive to the axial position of said piston in said pressure tube for the amount of flow restriction provided, said second control means providing a substantially unrestricted path for fluid flow and when said piston is traveling in a first direction.

References Cited in the file of this patent
UNITED STATES PATENTS

| | | |
|---|---|---|
| 2,171,827 | Elliott | Sept. 5, 1939 |
| 2,327,295 | Whisler | Aug. 17, 1943 |
| 2,357,278 | O'Connor | Aug. 29, 1944 |
| 2,559,632 | Katz | July 10, 1951 |
| 2,559,633 | Katz | July 10, 1951 |
| 2,819,064 | Pera | Jan. 7, 1958 |
| 3,003,595 | Patriquin | Oct. 10, 1961 |
| 3,006,628 | Utting | Oct. 31, 1961 |
| 3,078,967 | Brown et al. | Feb. 26, 1963 |